Patented Mar. 3, 1936

2,033,091

UNITED STATES PATENT OFFICE 2,033,091

PHENOL-FORMALDEHYDE RESIN

Herman A. Bruson, Philadelphia, Pa., assignor to
The Resinous Products & Chemical Co. Inc.,
Philadelphia, Pa.

No Drawing. Application June 21, 1933,
Serial No. 676,930

15 Claims. (Cl. 260—4)

This invention relates to new synthetic resins derived by condensation from formaldehyde and $\alpha,\alpha,\gamma,\gamma$-tetramethylbutylphenol, a new phenol having the formula

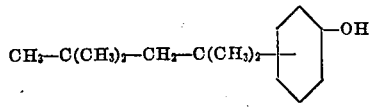

which may be prepared by condensing an equimolecular mixture of phenol and diisobutylene with a small quantity of concentrated sulfuric acid as a catalyst, i. e. an amount of 96% sulfuric acid corresponding to about 0.15 mole $H_2SO_4$ per mole of diisobutylene. This process for making $\alpha,\alpha,\gamma,\gamma$-tetramethylbutylphenol is described in detail in a co-pending application bearing Serial No. 600,826 filed by W. F. Hester (now Pat. No. 2,008,017) and I therefore do not lay any claim to the process or product of Hester's invention, but only to the condensation product thereof with formaldehyde and/or other ingredients as described more specifically herein, and as set forth in the claims herewith.

I have found namely, that if formaldehyde is condensed with $\alpha,\alpha,\gamma,\gamma$-tetramethylbutylphenol under the conditions described below extremely pale or colorless resins are formed which are readily soluble in aliphatic, aromatic, or hydro-aromatic hydrocarbons as well as in drying, semi-drying, or non-drying animal or vegetable oils and fats. These new resins differ from the previously known resins made by other processes from known nuclear alkylated or substituted phenols such as those derived from styrylphenol, butylphenols, p-ter-amylphenol, o- and p-phenylphenol, cyclohexylphenol, benzylphenol, dihydroxydiphenyl and the like, in being not only very much paler in color but also in that the oleo-resinous varnishes, paints, lacquers, and enamels prepared from the formaldehyde-$\alpha,\alpha,\gamma,\gamma$-tetramethylbutyl-phenol resins are paler in color, more alkali resistant and more resistant to "after-yellowing" or discoloration by air or light when exposed in the form of films, then previously known phenolic resins.

This was entirely unexpected since there is very little information available as to the relationship between the structure of phenols used in formaldehyde condensations and the after-yellowing or alkali-resistance properties of the resins derived therefrom; and furthermore it could not have been foreseen that the $\alpha,\alpha,\gamma,\gamma$-tetramethylbutyl group would considerably differ from the somewhat related tertiary amyl or butyl groups in producing better light-resistance, better alkali resistance and paler color in the resulting oleo-resinous varnishes. In addition to these differences the $\alpha,\alpha,\gamma,\gamma$-tetramethylbutylphenol resins are much less reactive than those heretofore produced from known phenols and are therefore more adapted for cooking into oils in making varnishes since they do not tend to readily form insoluble, infusible resins on prolonged heating. Moreover, since $\alpha,\alpha,\gamma,\gamma$-tetramethylbutylphenol can be produced almost quantitatively and at a much lower cost than any of the known substituted phenols (other than cresols) by condensing phenol with pure diisobutylene (from gasoline refining) by the Hester process, the new resins described herein possess considerable economic advantages over such prior processes.

In practicing this invention, substantially pure $\alpha,\alpha,\gamma,\gamma$-tetramethylbutylphenol is first dissolved in at least one molecular equivalent amount of an alkali metal hydroxide such as sodium hydroxide or potassium hydroxide in aqueous solution, so as to completely form the alkali metal phenate. To this there is then added formaldehyde in amount depending upon the hardness of the resin desired, preferably more than one and less than 2½ moles of formaldehyde per mole of $\alpha,\alpha,\gamma,\gamma$-tetramethylbutylphenol, and the mixtures stirred and heated at about 90–95° C. for several hours (depending upon the rate of stirring and size of the batch) until no uncondensed $\alpha,\alpha,\gamma,\gamma$-tetramethylbutylphenol remains. During this condensation a small quantity of oxalic acid, sodium oxalate, or other water-soluble oxalate is added and the condensation is carried out preferably in an inert atmosphere such as nitrogen. The mixture is subsequently acidified, (preferably with dilute mineral acid such as sulfuric acid) in the presence of an inert volatile organic liquid which is immiscible with water but which is a solvent for the condensation product, such as ethylene dichloride, benzol, toluol, and the like. The resin + solvent layer is then separated, washed free from acid by means of water, and finally heated to expel the solvent and water and to convert the residue into the desired resin. During this dehydration the organic solvent boils off with the water in the form of a binary mixture and removes the water more effectively, thus preventing turbidity in the final resin.

It will thus be seen that the essential steps of this process consist in:

(1) Condensing pure (preferably vacuum distilled) $\alpha,\alpha,\gamma,\gamma$-tetramethylbutylphenol and formaldehyde, not with a catalytic small amount of alkali but with at least a full molecular equivalent quantity of a strong alkali metal hydroxide;

(2) Acidifying the above condensate in the presence of a water-soluble oxalate, and taking up the product in a water-insoluble, volatile, inert organic solvent which preferably forms a binary azeotropic mixture with water when vaporized;

(3) Completely removing the free acidity from the resin + solvent layer; and finally (4) Evaporating off the water and recovering the organic solvent at an elevated temperature, and at the same time hardening the residue by heat to the desired degree.

Example 1

A mixture of 206 grams purified $\alpha,\alpha,\gamma,\gamma$-tetramethylbutylphenol (melting point 84–85° C.) as made by condensing molar quantities phenol with di-isobutylene in the presence of concentrated sulfuric acid as a catalyst and distilling the acid-free material in vacuo, is dissolved in a solution of 52 grams sodium hydroxide (or an equivalent molecular amount of potassium hydroxide) in 800 ccm. water containing 10 grams of oxalic acid (hydrated) and the mixture heated with stirring to 90°–95° C. for about one-half hour until a smooth homogeneous soap-like gel is obtained. To this mixture there is then added 200 grams of 30% formaldehyde solution and the mixture heated with good agitation at 90–95° C. for 2½ hours in an atmosphere of nitrogen. The thick somewhat yellow mass thus obtained, is cooled to 50–60° C. and acidified with the addition of a solution of 70 grams of 93% sulfuric acid in 300 ccm. of water and stirred rapidly while adding 150 ccm. of ethylene dichloride. After stirring for about one-half hour at 50–60° C. the mixture is allowed to stand, and the ethylene dichloride layer run off and separated from the water layer. The ethylene dichloride solution is then thoroughly washed free from acid by means of water and finally heated with stirring in an atmosphere of nitrogen or carbon dioxide, at atmospheric pressure or in vacuo, to remove the ethylene dichloride, and to convert the residue into a hard, high molecular, brittle resin. This is best accomplished by distilling off the ethylene dichloride at ordinary atmospheric pressure which operation at the same time removes all the water and leaves a transparent colorless sirup. The latter is then heated at 100–130° C. during about 3 hours, at atmospheric or reduced pressure until the desired hardness is reached. A product melting at 80–85° C. has been found to possess satisfactory properties. It is a transparent water-white resin readily soluble in benzol, petroleum naphtha, ligroin and linseed oil.

In the above example, the ethylene dichloride can be replaced by benzol or toluol if desired. It is essential that the entire operation be carried out in non-ferrous apparatus with iron-free chemicals if an absolutely colorless resin is desired. On a practical scale pure copper equipment has been found to be suitable. Under these conditions a resin paler in color then the palest "water-white" rosin of commerce is obtained. If the organic solvent is not used it is extremely difficult to obtain clear pale resins during the hardening process.

The formaldehyde ratio may vary from 1–2.5 moles per mole of the $\alpha,\alpha,\gamma,\gamma$-tetramethylbutylphenol but the best products are those made from 1.5–2 moles formaldehyde per mole of the phenol.

I have also found that the condensation of formaldehyde with $\alpha,\alpha,\gamma,\gamma$-tetramethylbutylphenol if carried out in the presence of 4,4'-[dihydroxydiphenyl]-dimethylmethane tends to give phenolic resins of improved siccative properties when used in oleo-resinous varnishes. For example, if as already known, formaldehyde is condensed with 4,4'-[dihydroxy-diphenyl]-dimethylmethane by means of alkali hydroxide as condensing agent, the resin obtained is soluble in alcohol but is insoluble in hydrocarbons. However, if $\alpha,\alpha,\gamma,\gamma$-tetramethylbutylphenol is also present, the mixed condensate obtained is readily soluble in benzol, toluol, xylol and the like but is insoluble in alcohol.

In practicing this part of my invention the procedure is essentially as follows:

Example 2

A mixture of 206 grams purified $\alpha,\alpha,\gamma,\gamma$-tetramethylbutylphenol, 23 grams of p,p'-[dihydroxydiphenyl]-dimethylmethane, and 10 g. hydrated oxalic acid is treated with a solution of 60 grams of sodium hydroxide in 1000 cc. water and the mixture heated with stirring to 90–95° C. in an atmosphere of nitrogen. The homogeneous thick mass thus obtained is treated with 240 g. of 30% formaldehyde solution and the mixture heated for an additional 2½ hours at 90–95° C. The thick yellow mass thus obtained is cooled to 50–60° C. and acidified by the addition of a solution of 90 g. of 96% $H_2SO_4$ in 300 cc. of water. The resinous mass which forms is taken up in ethylene dichloride and the solution washed and dehydrated in a similar manner to that given in Example 1.

All of the above resins are readily soluble in fatty oils and higher fatty acids. They may be converted into new resins by heating with rosin or ester gum if desired and made into oleoresinous varnishes of exceptional durability by dissolving in drying oils.

What I claim is:

1. A process for making a synthetic resin which comprises heating at reaction temperature, $\alpha,\alpha,\gamma,\gamma$-tetramethylbutylphenol in the presence of a solution of at least one mole equivalent of an alkali metal hydroxide with reacting proportions of formaldehyde, and, in the presence of oxalate ions, subsequently acidifying the condensate and converting the acid-free product to the solid state by heating in the presence of a volatile inert, water-immiscible organic solvent for the resin, at a dehydrating temperature so as to eliminate the solvent.

2. A process as set forth in claim 1, in which the molal ratio of the formaldehyde is from 1 to 2.5 moles HCHO per mole of $\alpha,\alpha,\gamma,\gamma$-tetramethylbutylphenol.

3. A process as set forth in claim 1, in which the alkali metal hydroxide used is sodium hydroxide.

4. A process as set forth in claim 1, in which the organic solvent used is one whose vapor forms a binary azeotropic mixture with water vapor.

5. A process as set forth in claim 1 in which the organic solvent used is ethylene dichloride.

6. A process for making a synthetic resin which comprises heating one mole equivalent of crystalline $\alpha,\alpha,\gamma,\gamma$-tetramethylbutylphenol with two mole equivalents of formaldehyde and at least one mole equivalent of sodium hydroxide in aqueous solution at 90–95° C. for about 2½ hours, subsequently acidifying the mixture with dilute sulfuric acid in the presence of a water-soluble oxalate, taking up the product in ethylene dichloride, washing the ethylene dichloride solution with water until free from acidity, and hardening the residue after distilling off the ethylene dichloride and moisture.

7. A resinous condensation product of $\alpha,\alpha,\gamma,\gamma$-tetramethylbutylphenol and formaldehyde, said product being a pale, transparent brittle mass readily soluble in hydrocarbons and drying oils, and characterized by high resistance to air, alkali, and sunlight.

8. A process for making a synthetic resin which comprises heating at reaction temperature, $\alpha,\alpha,\gamma,\gamma$-tetramethylbutylphenol with p,p'-[dihydroxydiphenyl]-dimethyl methane in the presence of a solution of alkali metal hydroxide sufficient to at least combine with all the phenolic hydroxyl groups and in the presence of a water-soluble oxalate with reacting proportions of formaldehyde, subsequently acidifying the reaction product in the presence of ethylene dichloride, and after washing the ethylene dichloride solution free from acidity, hardening the residue by distilling off the ethylene dichloride.

9. A resinous condensation product of $\alpha,\alpha,\gamma,\gamma$-tetramethylbutylphenol, 4,4'-[dihydroxydiphenyl]-dimethylmethane and formaldehyde, said resin being readily soluble in aromatic hydrocarbons and in drying oils.

10. In the process of preparing an oil-soluble resin, the step which comprises heating a solution of $\alpha,\alpha,\gamma,\gamma$-tetramethylbutylphenol in the form of its alkali metal salt, with formaldehyde in the presence of a water-soluble oxalate.

11. In the process of preparing an oil-soluble resin, the step which comprises heating $\alpha,\alpha,\gamma,\gamma$-tetramethylbutylphenol in an aqueous solution containing oxalic acid with an amount of sodium hydroxide at least molecularly equivalent to the total acidity of such solution, and between 1 and 2.5 mole equivalents of formaldehyde per mole of the $\alpha,\alpha,\gamma,\gamma$-tetramethylbutylphenol.

12. A process for making a resin which consists in (1) heating a mixture of 1 mole equivalent $\alpha,\alpha,\gamma,\gamma$-tetramethylbutylphenol, and 2 mole equivalents formaldehyde with at least one mole equivalent of sodium hydroxide in aqueous solution in the presence of a water-soluble oxalate at 90–95° C. until all of the phenate has combined with the formaldehyde, (2) acidifying the mixture, (3) dissolving the condensate in ethylene dichloride, washing the ethylene dichloride layer free from acidity and separating it from the aqueous layer, and (4) distilling off the ethylene dichloride and hardening the residue by heat at 100–130° C.

13. A resinous compound comprising the reaction product of $\alpha,\alpha,\gamma,\gamma$-tetramethylbutylphenol and formaldehyde.

14. A resinous compound comprising the reaction product of tertiary tetramethylbutylphenol and formaldehyde.

15. In the process of preparing a resin the step which comprises condensing $\alpha,\alpha,\gamma,\gamma$-tetramethylbutyl phenol with reacting proportions of formaldehyde in a caustic alkali solution.

HERMAN A. BRUSON.